United States Patent [19]

Taylor

[11] 4,263,933
[45] Apr. 28, 1981

[54] PRESSURIZED TANK SAFETY VALVE

[76] Inventor: David F. Taylor, 120 Hillside Ave., Bridgewater, N.J. 08807

[21] Appl. No.: 37,959

[22] Filed: May 9, 1979

[51] Int. Cl.³ ............................................. F16K 17/30
[52] U.S. Cl. ..................................... 137/115; 137/498
[58] Field of Search ........................ 137/460, 498, 517

[56] References Cited

U.S. PATENT DOCUMENTS

| 228,493 | 6/1880 | Tyler | 137/517 |
|---|---|---|---|
| 1,060,142 | 4/1913 | Stevens | 137/517 X |
| 2,179,144 | 11/1939 | Buttner | 137/517 |
| 2,357,321 | 9/1944 | Fuller | 137/460 |
| 2,917,077 | 12/1959 | Ziege | 137/517 X |
| 3,085,589 | 4/1963 | Sands | 137/498 |
| 3,143,135 | 8/1964 | Cornelius | 137/517 X |
| 3,469,605 | 9/1969 | Courtot | 137/498 X |
| 3,618,626 | 11/1971 | Russo | 137/498 X |

Primary Examiner—Robert G. Nilson

[57] ABSTRACT

In a preferred embodiment of the invention, an accessory safety valve is provided for mounting within outlet-ports of tanks designed to contain pressurized gas of some sort, particularly of an explosive or caustic nature, to replace the conventional outlet conduit normally mounted in such tanks which normally have the on-off valve exterior to the tank devoid of any safety back-up feature, the present accessory safety valve having the pressure-responsive safety mechanism mounted within the end of the conduit passage that extends totally inside the tank totally beyond exterior-mounting male thread to the conduit, placing the valve and valve set therefor thereby in a removed position protected against damage and failure in the event of an exterior-tank blow or impact against portions of the conduit mounted exterior to the tank.

18 Claims, 5 Drawing Figures

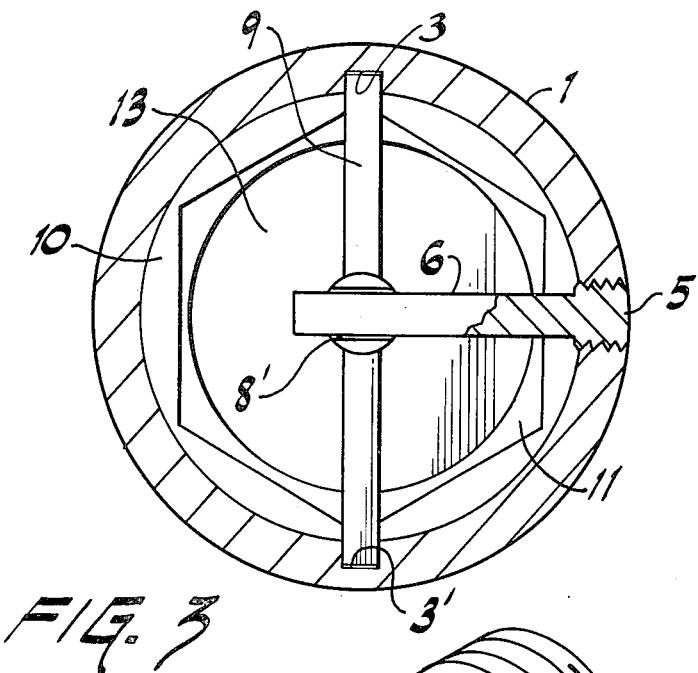
FIG. 3
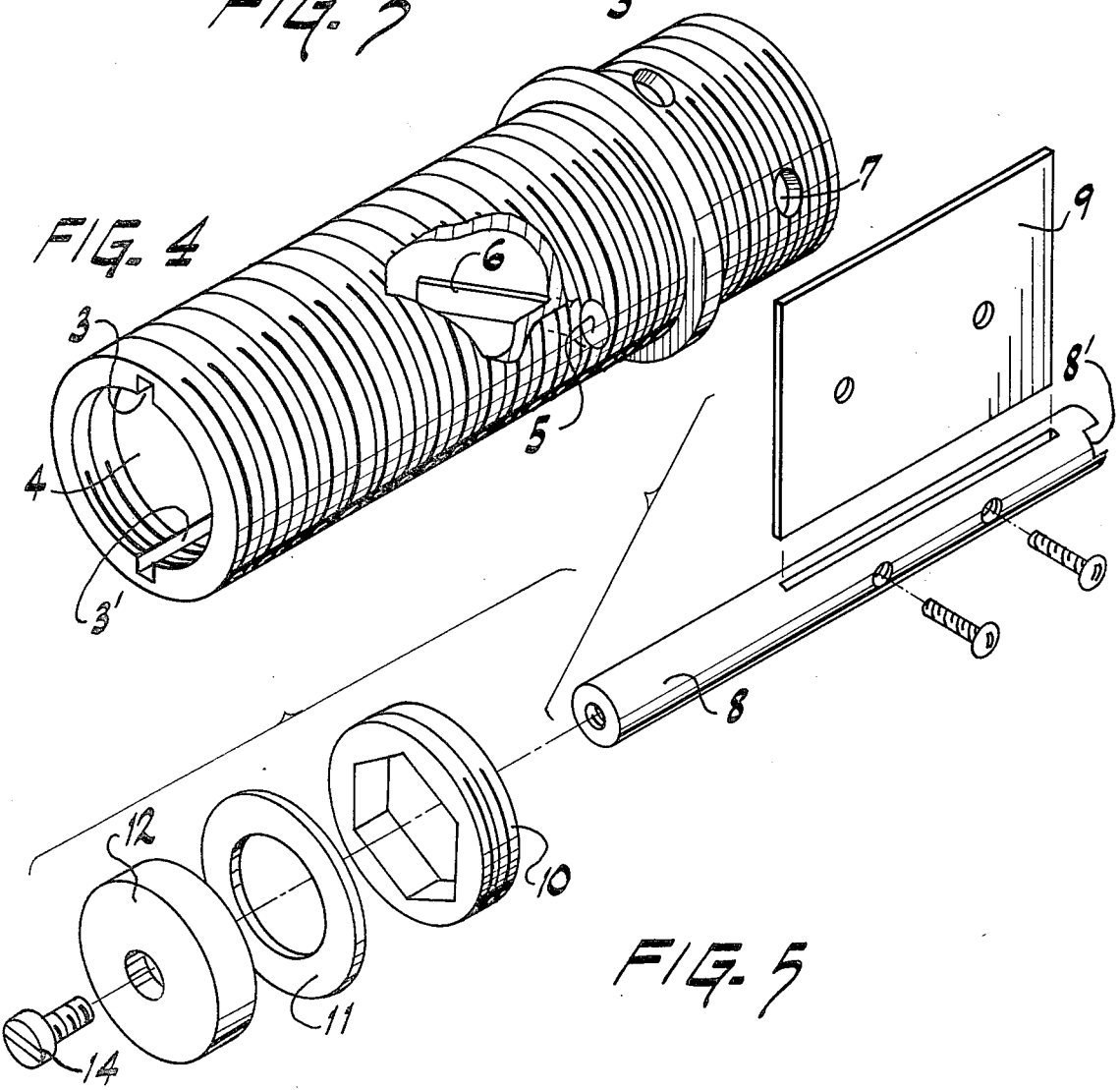
FIG. 4
FIG. 5

PRESSURIZED TANK SAFETY VALVE

This invention is directed to a novel and improved safety valve for pressurized tanks of gases.

BACKGROUND TO THE INVENTION

Prior to the present invention, there has existed an ever-increasing hazard in the use of pressurized commercial tanks for the transporting of caustic and/or explosive gases, which tanks are devoid of any safety-valve feature what-so-ever often, and in other situations, the nature of the safety-valve is subject to the same hazards in the event of an accident resulting in an impact or blow to the outlet conduit or safety-lock-containing portion thereof. The criticality of the situation has increased by many fold recently—in recent years and months, during which gaseous fuels are transported in large trucks and tanks and railroad cars and the like; but particularly, there is now underway the manufacture of motor vehicles driven by pressurized inflammable gas which carry the fluid gas within pressurized tanks a part of the vehicle itself, subject to explosion or at-least to flash-fire and destruction of life and/or property within the vehicle as well as to those in the immediate vicinity.

While heretofore such situation has not been remedied, and the extreme hazards associate have not been loudly proclaimed, the sole existing prior art that has thus far been available is typified by U.S. Patents such as follow. Each of U.S. Pat. Nos. 1,525,775 (W. E. Floyd et al.) and 1,136,606 (M. W. Loyd et al.) and 2,765,801 (F. E. Selim) have portions of the valve-guidable structure and shaft-like structure thereof extending "past" the point of the tank wall of the port into which the valve has been screw-mounted, with the result that any major blow readily would likely impair proper axial movement thereof thus preventing the safety valve from becoming properly seated in its valve seat. Accordingly, such safety or lock valves are not destruction-proof by accidents as often occur in highway-driven motor vehicles, nor for presurized tanks being otherwise transported by truck or rail. Further examples of such prior safety or lock-valves are those of U.S. Pat. Nos. 3,159,167 and 1,513,020 and 2,563,244 each of which either have all or a major portion thereof exterior to the port-forming walls of the pressure tank. By such valves, any traffic accident could readily cause a leak—major or minor, either of which could lead to explosion, fire, or the breathing of deadly gas fumes.

SUMMARY OF THE INVENTION

Accordingly, objects of the present invention include the obtaining of a safety valve which overcomes and/or avoids one or more problems and disadvantages of the types discussed-above, together with the obtaining of novel advantages to be hereinafter further described.

Another object is, in particular, to obtain a pressurized tank safety valve that will remain fully operative to immediately terminate flow of gas in the event that the valves outlet conduit at the surface of the walls of the tank or exterior thereto becomes severely damaged or destroyed by impact thereto or shearing-off thereof.

Another object is to obtain a pressurized tank safety valve device that may be readily and easily mounted on existing current day pressurized tanks without major difficulties.

Another object is to obtain a pressurized tank safety valve device which includes a gas counter-pressure mechanism for either or recharging the tank to a filled pressurized state again after use, or returning the closed safety valve to an open state.

Another object is to obtain a pressurized tank safety valve device having as a part thereof a lock-on mechanism preventing accidental loosening of the safety valves outer connector.

Another object is to obtain a pressurized tank safety valve in which there is a spring mechanism resisting unwarrantable valve-closing in response to minor fluctuations.

Another object is to obtain a pressurized tank safety valve of simple and economic construction and manufacture.

Other objects become apparent from the preceding and following disclosure.

One or more objects of the invention are obtained by the invention as defined hereinafter, typically as illustrated by the accompanying embodiments of the Figures which are intended to improve understanding of the nature and heart and operation of the invention, but not to unduly limit the invention to the merely particular illustrated embodiments.

Broadly the invention may be described as a safety valve having a housing structure and through-passage thereof with inlet and outlet openings, having its valve seat adjacent (in juxtaposition to) the inlet opening and responsive to inside tank pressure to close the valve thereof against the valve seat as gas rushes toward the outlet opening; the exterior male mounting-threads on the housing structure are of conventional encircling-type and are located at a point spaced-away from the inlet opening toward the outlet opening at a position and point beyond and spaced-away-from guide support structure that guides the safety valve to its valve seat. Thereby the terminal end of such guide support structure nearest the outlet opening is located well within the tank in its entirety when the housing structure is mounted by its exterior male mounting threads within a female-threaded tank port. The valve includes valve guide-following structure having a shape and configuration that follows the guide support structure, with the valve guide-following structure extending axially within the through-passage at least in a preferred embodiment, in any event the terminal end thereof closest to the outlet opening being of a length dimension such that it is spaced-away from a beginning point of the above-noted exterior male mounting-treads on the housing structure.

In a preferred embodiment, there is included a spring mechanism, preferably a leaf spring mounted within the through-passage, positioned within the passage in a biasing position and location to bias the terminal end in a reverse direction into an open-state whenever there is merely minor pressure differential on opposite sides of the valve at the valve-seat location. More preferably, the guide support structure of the valve-seat includes male threads and the housing structure's inner wall at the inlet opening (positioned within the tank when mounted) includes female threads within which the male threads of the guide support structure are mounted; it should be noted, however, that the configuration of the guide support structure is such that it does not impede nor block flow of gas through said inlet opening and through the through-passage when the valve is in an open state and position.

There is preferably a through-passage connector mounted on the housing structure at the outlet opening (positioned outside the tank when mounted), adapted to connect thereto an exterior conduit of a conventional type normally used to draw-off gas from a pressurized gas tank outlet. In like manner, a source of pressurized gas to be transported is to be connected hereto.

In a further preferred embodiment, as a part of the through-passage connector there is provided a valve-passage into the through-space of the through-passage connector, with a further valve and valve seat provided therein adapted for the adding of gas pressure therethrough into the through-space of the through-passage whenever there is the desire to recharge or to otherwise reopen the valve at the inlet opening of the housing structure; in other words, whenever the atmospheric pressure (or equivalent pressure within the through-passage of the housing structure exterior to the valve at the inlet opening is "less than" interior tank pressure on the tank-side of the valve at the inlet opening, pressurized gas is injected through the valve-passage into the through-space of the through-passage connector and thereby into the through-passage of the housing structure thereby equalizing the tank-pressure and serving to force rearwardly (by excessive injected-gas pressure or by the coincident biasing force of the spring) the valve to an open state and position.

At the outlet end of the interior walls of the through-passage connector there is provided female threads by which conventional types of normal take-off conduits or hoses may be connected in the same manner that normally such would be connected to the non-safety type female outlet to a pressurized tank. Thus, by this mechanism of the outlet female threading, this through-passage connector serves also as an adapter.

In a further preferred embodiment, the exterior male-threaded outlet opening-end of the housing structure includes one or more space-apart indentations or depressions along an axis-direction adapted to receive and lock-in a set-screw, and accordingly the through-passage connector includes one or more set-screw holes having a set screw mounted in one or more thereof, locking the through-passage connector into a mounted position on the housing structure.

Accordingly, by the present invention, the pressurized gas safety valve is entirely placed within a high-pressure tank by virtue of the location of the exterior male threads on the housing structure as compared to the spaced-away location and positioning of the valve guide structure and valve structure itself being well spaced-away from the beginning point of those exterior male threads. As a result thereof, should there be an accidental abusing of the housing structure at the tank-surface at the tank port in which the housing structure is mounted by the male threads, such damage would not alter the operation nor impair the operation of this present inventive safety valve mechanism which would immediately shut-off flow of gas from the tank, even if the exterior portion of the housing structure were totally sheared-off. This is in sharp contrast to the prior art where operation of the valve most likely would be impaired thereby allowing leakage and loss of gas producing thereby a further hazardous condition. Thus, the present inventive device increases the safety involved in handling and transporting all high-pressure tanks presently used in hospitals, schools, laboratories, etc. Also, as important, is the fact that this disclosed invention is easily adapted to or used with current-day existing tanks, not requiring any revamping of industry nor modification of existing tanks, thus enhancing the feasibility of immediate widespread use of the inventive safety device of this invention.

The invention may be better understood by making reference to the following Figures.

THE FIGURES

FIG. 3 illustrates a cross-sectional view as taken along lines 3—3 of FIG. 2.

FIG. 4 illustrates an end-perspective view of the cylindrical housing structure and interior structure thereof, with partial cut-away showing the suspended leaf spring mounted therein.

FIG. 5 illustrates an exploded view in perspective view, of the guide support structure and valve thereof.

DETAILED DESCRIPTION

Figure 1:
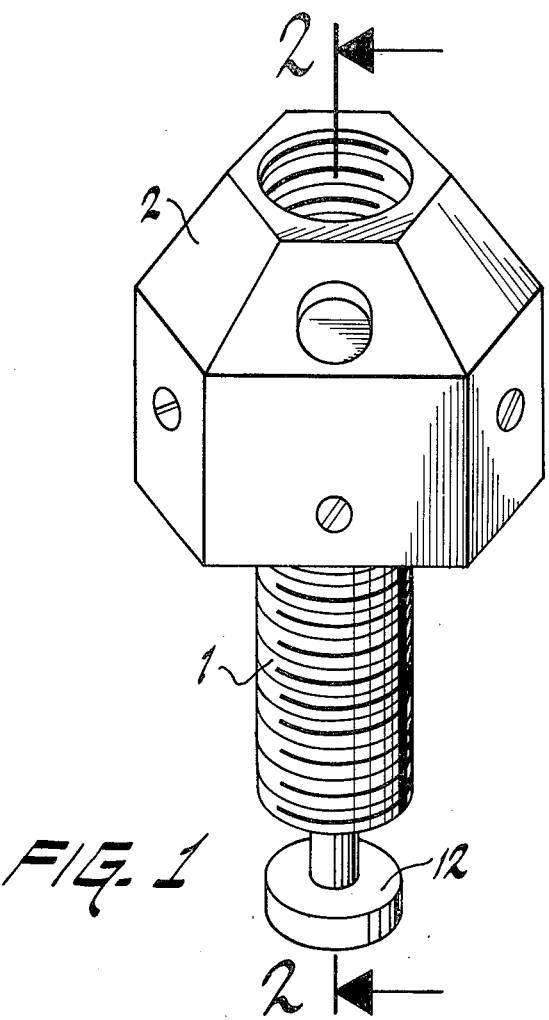
FIG. 1 illustrates a side perspective view of a preferred embodiment of the pressurized tank safety valve.
Figure 2:
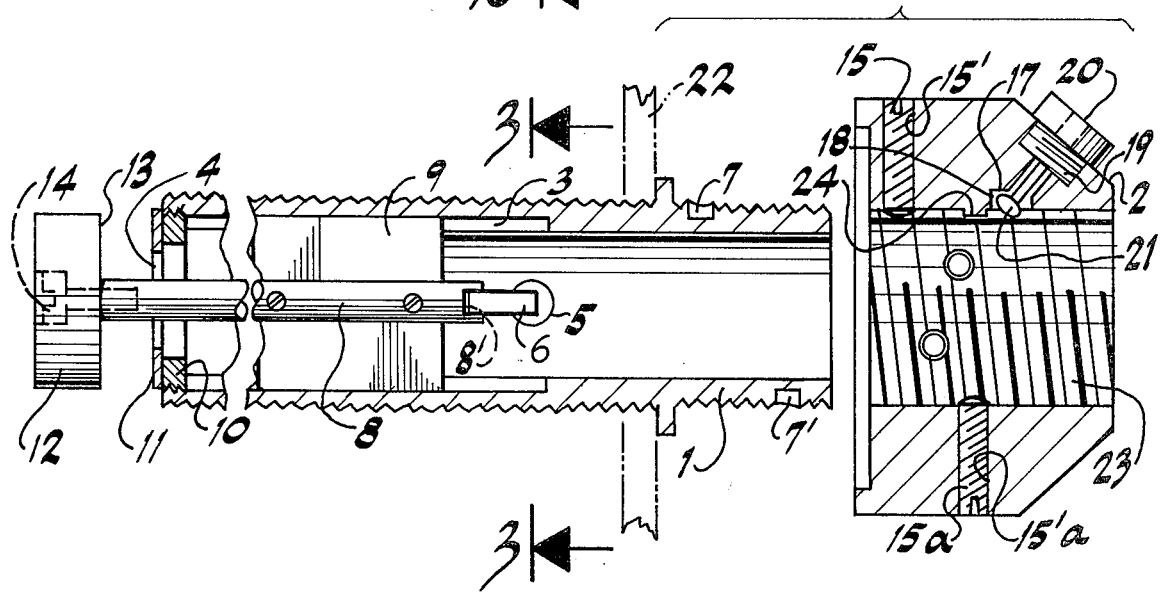
FIG. 2 illustrates a side cross-sectional view in partially exploded view, as taken along lines 2—2 of FIG. 1.

The entire device consists principally of three member: (a) a cylinder 1 is externally threaded so as to be able to be turned into an existing tank, and (b) a collar 2 is internally threaded for attachment to the cylinder 1, and also internally threaded to accommodate (c) an existing external valving, incorporating the leaf-spring resetting feature. All FIGS. 1 through 5 are directed to the same preferred embodiment.

The housing structure cylinder 1 is externally threaded and also has at least two opposing internal grooves 3 designed to guide the fins 9 of the guide-following valve-stem 8. An angularly-bored and threaded hole 5 in the wall of the housing structure cylinder 1 receives a plug that supports the leaf-spring 6 that resets and/or resists the closing of the valve-disc 12. Spaced-apart recesses 7 and 7' are lock-positions for receiving the set-screws 15 and 15a in their set-screw holes 15' and 15'a, which set the through-passage connector collar 2 onto the cylinder 1 at the externally male-threaded outlet opening end thereof. The housing structure cylinder 1 is internally threaded at its inlet opening inner end 4 to accomodate male-threaded guide-support stop-ring 10 which includes an attached gasket 11 overhanging the inlet opening space, typically cemented to the stop-ring. The reset leaf spring 6 is placed at such a position in the wall of the housing structure cylinder 1 that it is resting in a non-tension state relative to the valve-stem 8 when the valve-disc is in an open state and position, and is flexed and biasing against the terminal end 8' of valve-stem 8 when the valve disc face 13 is in a closed state against gasket 11. Valve-stem 8 is attached to the valve-disc 12 by a sealant plug 14. The valve-stem-fin 9 of the guide-following structure, is fitted into the grooves 3 and 3' prior to screwing-in the guide-support stop-ring 10. Shown in phantom, a tank wall 22 has a port into which the housing structure cylinder 1 has been threaded in FIG. 2, inside the tank being to the left of the tank wall, and outside exterior space being to the right of the tank wall.

The through-passage connector collar 2 is externally of any suitable shape desired, preferably hexagonal such that a conventional hexagonal tool may fit thereon to tighten the member onto the tank as thereby the housing structure cylinder 1 is screwed into a port of a tank. Stops 24 limit the extent of mounting distance.

At some appropriate position on the through-passage connector collar 2 a pressurizing valve through-passageway 20 with valveseat 17 having a cap mounted by male threads 19 over a pressure valve 21 within recess space 18. This valve is used to pass pressurized air or other gas into the interior space of the collar after the take-off line (not shown) has been connected to female threads 23. Thereby the low pressure within that space is raised to off-set high-pressure within the tank, whereby the valve disc 12 opens to permit the pressurized gas within the tank to be withdrawn through the take-off line. Also, if and whenever the valve-disc 12 is otherwise closed, it may be reopened by such procedure.

It is within the scope and spirit of this invention to include obvious substitutions and equivalents, as would be obvious to a person of ordinary skill in this art.

I claim:

1. A safety valve comprising in combination: a housing structure means for supporting and mounting valve structure, having a through-passage and passage inlet and outlet openings thereto, including an inner valve structure having a first valve seat in juxta-position to said inlet opening structured and positioned to seat a valve movable in a direction of said outlet opening toward a seating position and the first valve seat including valve guide-support structure adapted to support a valve in an open state and to guide the valve toward and support the valve in a seated state; said housing structure means including external male threads adapted for inserting the passage inlet opening-end of said housing structure means into a female-threaded aperture, the external male threads being formed on said housing means encircling the housing structure and the external male threads being located at least at a first point spaced-away from said passage inlet opening-end at a position beyond and spaced from said valve guide-support structure along an axial direction of said through-passage, and the external male threads continuing from said first point toward said passage inlet opening-end; and a first valve means for being supported by and guided by said guide-support structure and for sealably seating in a closed state onto said valve seat and for being supported by the valve guide-support structure in an open state, the first valve means including guide-following structure of a shape adapted to follow said valve guide-support structure and being of a length dimension along an axis parallel to said through-passage at the inlet opening such that the guide-following structure at a distal terminal end thereof is spaced-away from said first point toward said passage inlet opening-end, whereby said guide-support structure and said guide-following structure are located fully within a tank when the housing structure is mounted at said first point by said external male threads with the female-threaded aperture.

2. A safety valve of claim 1, including spring-biasing means mounted in said housing structure positioned to be biased-against said first valve means when the first valve means is within a closed-valve state and position, in a biasing direction toward an open state and position.

3. A safety valve of claim 1, including a through-passage connector means for connecting an exterior conduit to said housing structure means at said outlet opening.

4. A safety valve of claim 3, in which said through-passage connector means is further for connecting into communication with a connector through-passage space thereof a source of pressurized gas exterior to a tank in which said housing structure means is mounted.

5. A safety valve of claim 4, in which said through-passage connector means includes a second valve seat and second valve seated therein positioned to be in a closed seated state and position when pressure within said through-passage connector means' through-space is greater than atmospheric pressure exterior thereto, and the through-passage connector means including a valve passage separate from and apart from inlet and outlet ports to said through-passage connector means, the valve passage being in communication with through-space of said through-passage connector means and said second valve seat and second valve being mounted and structured to control gas flow into through-space of the through-passage connector means from a pressurized-gas source when connected in communication with said valve passage exterior to the through-passage connector means at an inlet of said valve passage adapted to equalize pressure within through-space of the through-passage connector means whereby increased gaseous pressure within through-space of the through-passage connector means will cause said first valve seat to open to an open state and position at said inlet opening.

6. A safety valve of claim 5, including spring-biasing means mounted on said housing structure means positioned to be biased-against said first valve means when the valve means is in a closed-valve state and position, in a biasing direction biasing the first valve means toward an open state and position.

7. A safety valve of claim 6, in which said through-passage connector means includes through-space and has inlet and outlet ports in communication with said through-space, and has female threads at said inlet port of dimensions adapted for the mounting thereof onto said male threads of said housing structure means at said outlet opening of said housing structure.

8. A safety valve of claim 7, including female threads at said outlet port adapted for the mounting of male threads of an exterior conduit thereto.

9. A safety valve of claim 6, in which said spring-biasing means comprises a leaf spring mounted within said through-passage biased against said guide-following structure when said first valve means is in a seated closed state and position.

10. A safety valve of claim 3, in which said through-passage connector means includes through-space and has inlet and outlet ports in communication with said through-space, and has female threads at said inlet port of dimensions adapted for the mounting thereof onto said male threads of said housing structure means at said outlet opening of said housing structure means.

11. A safety valve of claim 10, including female threads at said outlet port adapted for the mounting of male threads of an exterior conduit thereto.

12. A safety valve of claim 10, in which said through-passage connector means has at-least one female-threaded set-screw hole extending radially inwardly through wall structure thereof and a male-threaded set-screw mounted therein, and in which said housing structure means includes at-least one set-screw-receivable surface depression into which said male-threaded set-screw is screwable and lockable of the through-passage connector means in a non-detachable state when the through-passage connector means is mounted on said housing structure means.

13. A safety valve of claim 12, in which said housing structure means includes a plurality of alternately-available ones of said set-screw-receivable surface depressions.

14. A safety valve of claim 8, in which said through-passage connector means has at-least one female-threaded set-screw hole extending radially inwardly through wall structure thereof and a male-threaded set-screw mounted therein, and in which said housing structure means includes at-least one set-screw-receivable surface depression into which said male-threaded set-screw is screwable and lockable of the through-passage connector means in a non-detachable state when the through-passage connector means is mounted on said housing structure means.

15. A safety valve of claim 1, in which said valve guide support structure extends axially within said through-passage and is mounted on an inner wall of said housing structure means, said valve guide support structure including through-channel space permitting flow of gas through said through-passage when said first valve means is positioned in an open gas-flow state.

16. A safety valve of claim 15, in which said housing structure means includes an inner cylindrical wall forming said through-passage and has female threads at said passage inlet, and in which said valve guide support structure is a separate portion having male threads on an exterior thereof mounted within female threads of said inner cylindrical wall at said passage inlet.

17. A safety valve of claim 16, in which said through-passage has opposite elongated slots along its inner wall extending along an axial length of the through-passage of the housing structure means as a part of said valve guide support structure, and in which said guide-following structure includes a fin extending loosely and slideably between the elongated slots seated therein, and the first valve means further includes a sealing valve disc having an axially-extending valve-stem mounting said fin, and said valve guide support structure further includes a stop-ring structure mounted as a barrier at an open end of each of said opposite elongated slots preventing withdrawal of the fin from the opposite elongated slots.

18. A safety valve of claim 3, in which barrier stop means is included on an inner surface of passage wall of said through-passage connector for limiting the extent to which the through-passage connector can be screwed or otherwise mounted onto said housing support at said outlet opening.

* * * * *